(12) United States Patent
Schubert

(10) Patent No.: US 8,975,515 B2
(45) Date of Patent: Mar. 10, 2015

(54) TOWER OF A WIND ENERGY INSTALLATION WITH CURRENT CONDUCTION MEANS

(71) Applicant: Repower Systems SE, Hamburg (DE)

(72) Inventor: Matthias Schubert, Rendsburg (DE)

(73) Assignee: Senvion SE, Hamburg (DE)

( * ) Notice: Subject to any disclaimer, the term of this patent is extended or adjusted under 35 U.S.C. 154(b) by 129 days.

(21) Appl. No.: 13/799,961

(22) Filed: Mar. 13, 2013

(65) Prior Publication Data
US 2013/0194705 A1    Aug. 1, 2013

Related U.S. Application Data

(63) Continuation of application No. PCT/EP2012/000232, filed on Jan. 19, 2012.

(30) Foreign Application Priority Data

Jan. 26, 2011    (DE) .................. 10 2011 003 208

(51) Int. Cl.
*H02H 7/06*    (2006.01)
*F03D 11/00*    (2006.01)

(52) U.S. Cl.
CPC ............. *H02H 7/06* (2013.01); *F03D 11/0058* (2013.01); *Y02E 10/722* (2013.01)
USPC ......................................... 174/45 R; 174/51

(58) Field of Classification Search
CPC . F03D 11/005; F03D 11/0058; Y02E 10/726; Y02E 10/722; H02H 7/06
USPC .... 174/32, 377, 51, 45 R, 5 R, 5 SG; 361/20, 361/21
See application file for complete search history.

(56) References Cited

U.S. PATENT DOCUMENTS

| | | | |
|---|---|---|---|
| 4,668,035 A | 5/1987 | Jego et al. | |
| 8,383,933 B2* | 2/2013 | Mogensen et al. | ................ 174/2 |
| 2005/0042099 A1* | 2/2005 | Wobben | ................... 416/132 B |
| 2010/0212784 A1 | 8/2010 | Hannay | |

FOREIGN PATENT DOCUMENTS

| | | |
|---|---|---|
| AT | 43207 | 7/1910 |
| DE | 10152557 | 6/2003 |

(Continued)

OTHER PUBLICATIONS

International Search Report filed in PCT/EP2012/000232.

*Primary Examiner* — Hoa C Nguyen
*Assistant Examiner* — Amol Patel
(74) *Attorney, Agent, or Firm* — Rankin, Hill & Clark LLP

(57) ABSTRACT

A tubular tower (11), of a wind energy plant (10) with a current conduction means system (25, 35) for transmitting electrical power from a generator on the tower (11), to a power module at the base of the tower. The current conduction means system (25, 35) has three electrical conductors (27.1, 27.2, 27.3; 37.1, 37.2, 37.3; 45.1, 45.2, 45.3) arranged next to one another. A housing (26, 36, 46) is connected to the inner tower wall at predetermined distances using connecting devices which have electrical cross-sections conducting with the tower wall. The distances between the connecting devices in the longitudinal extent of the tower (11) and the cross-sections of the connecting devices between the housing (26, 36, 46) and the tower wall are dimensioned such that during a fault, the voltage drop between the tower wall and the housing (26, 36, 46) does not exceed a predetermined touch voltage.

13 Claims, 3 Drawing Sheets

(56) References Cited

FOREIGN PATENT DOCUMENTS

| | | |
|---|---|---|
| DE | 10216390 | 10/2003 |
| DE | 102008045650 | 3/2010 |
| WO | 03/036084 | 5/2003 |
| WO | 2004/083633 | 9/2004 |
| WO | 2004083633 | 9/2004 |
| WO | 2007/134599 | 11/2007 |

\* cited by examiner

TOWER OF A WIND ENERGY INSTALLATION WITH CURRENT CONDUCTION MEANS

BACKGROUND OF THE INVENTION

1. Field of the Invention

The invention relates to a tower, particularly a tubular tower, of a wind energy plant with a current conduction means system for transmitting electrical power from a generator, preferably arranged on a tower, to a power module, preferably formed at the base of the tower. The invention further relates to a wind energy plant and to a method for operating a wind energy plant.

Wind energy plants of the patent applicant are known under the description 5M, MM92, MM82, MM70 and MD77.

Modern wind energy plants generally have a tower on which a machine housing or nacelle with a rotor is set. The tower is formed in particular as a tubular steel tower and generally has a tapering form.

Furthermore, the tower itself generally consists of multiple steel tower sections, which are optionally composed of prefabricated shell segments.

2. Description of Related Art

In WO-A-2004/083633 a steel tower of a wind energy plant is described as well as a method for building a large-sized, cylindrical or conical tower for a wind energy plant.

Furthermore, in WO-A-03/036084 a wind energy plant is disclosed, which has a tower constructed from multiple tower segments, a generator arranged near the tower head, a power module arranged near the tower base and power rails premounted in the tower segments for transmitting current from the generator to the power module.

In many known wind energy plants, the electric power module of the wind energy plant, which includes electrical units such as the transformer, electrical cabinets, possibly an inverter module, a medium voltage system, and/or a low voltage distribution system, etc., is arranged below the generator level, and frequently near the base of the tower of the wind energy plant or also within the machine housing on the tower head. In order to transfer the electrical energy, which is produced by the generator located near the top of the tower within a nacelle, to the power module or respectively to the grid connection, power rails are provided, which run inside the tower in most cases.

Furthermore, the document DE-C-101 52 557 describes a wind energy plant having a tower constructed from multiple tower segments, a generator arranged in the region of the tower head, and a power module arranged in the region of the tower base, and having a current conduction means for transmitting current from the generator to the power module.

BRIEF SUMMARY OF THE INVENTION

Based on this prior art, the object of the present invention is to provide a wind energy plant which is or will be erected in a simple and favorable manner, wherein it shall be possible to maintain the required safety requirements.

This object is achieved by a tower, particularly a tubular tower, of a wind energy plant with a current conduction means system for transmitting electrical power from a generator, preferably arranged on a tower, to a power module, preferably formed at the base of the tower. The current conduction means system has three electrical conductors arranged next to each other, and the three electrical conductors are arranged in a housing, wherein using the housing one or the protective earthing conductor is designed for the electrical conductors arranged in the housing, wherein the housing is connected to the, preferably inner, tower wall at predetermined distances using connecting devices. The connecting devices have electrically conducting cross-sections and the distances between the connecting devices in the longitudinal extent of the tower and the cross-sections of the connecting device between the housing and the tower wall are dimensioned such that, in the event of a fault, e.g. a short circuit, the voltage drop between the tower wall and the housing does not exceed a predetermined touch voltage.

The invention is based on the idea to develop, using the housing as the protective earthing conductor for the electrical conductors, also designated as the current conduction means, a simple current conduction means system, having reduced weight compared to the previously known systems for current conduction means in wind energy plants, because the protective earthing conductor is provided by the housing.

By using the housing as the protective earthing conductor, the current conduction means system in the tubular tower of the wind energy plant is improved and simplified, wherein in particular the material expenditure and thus the costs for the overall wind energy plant are reduced.

In particular, the current conduction means system has exactly, or respectively only, three electrical conductors arranged next to each other in the inside of the (protective earthing) housing, wherein the exactly three electrical conductors are surrounded by the housing designed as the protective earthing conductor. The protective earthing conductor for the (exactly) three electrical conductors arranged next to each other has an electrically conducting housing, e.g. composed of steel, in which the electrical conductors conducting the current are arranged.

Furthermore, in the scope of the invention it is provided that in the event of an occurrence of a fault, e.g., an electrical short circuit, the voltage drop between the tower wall and the housing does not exceed a predetermined touch voltage. The connecting devices between the housing in the interior of the tower and the tower wall are designed electrically conducting, and the electrical cross-section of the connecting devices are designed, or respectively dimensioned in combination with the distances between the connecting devices in the longitudinal direction of the tower, such that for example with the occurrence of a short-circuit, the touch voltage, and thus the voltage drop between the tower wall and the housing designed as the protecting earthing conductor does not exceed 50 V.

This has the result that even with a possible occurrence of a short-circuit, persons contacting the tower wall do not experience a potentially life-threatening electrical shock. Thereby, the overall operating safety of the wind energy plant is increased even in the event of a short circuit. In the scope of the invention, it is also provided in one design of the tower that the touch voltage is less than 40 or 30 V, in order to minimize health hazards for people. The determination of the touch voltage advantageously occurs in consideration of the respectively valid national and international standards in the respective country of installation.

A further advantage results from using the housing for the electrical conductors as the protective earthing conductor such that the housing can be built with smaller dimensions than with the use of four electrical conductors.

On the other hand according to the prior art it is provided that in a shielded housing along with the three required electrical conductors for the three phases of the three-phase alternating current, an additional fourth electrical conductor is provided, and this fourth electrical conductor provided as a protective earthing conductor runs or is arranged particularly in parallel in the housing along with the three electrical conductors provided for the three-phase alternating current. This additional, fourth electrical conductor surrounded by the housing, is used or utilized as a protective earthing conductor according to the prior art.

According to the invention the power generated by the generator is transmitted via the electrical conductors or current conduction means to the base of the tower. In doing so, for example, the three phases of a three-phase alternating current are transmitted via the three electrical conductors located within the housing, wherein a neutral wire, or respectively neutral conductor, is not necessary, because the phases are symmetrically balanced, and thus a neutral wire (neutral conductor) does not transmit any power. The function of the protective earthing conductor is thereby assumed according to the invention by the housing for the protective earthing conductor. In the event of a short circuit (fault) high magnetic forces arise due to the impedance of the housing, which are absorbed by the correspondingly dimensioned holders for fastening the electrical conductors in the housing and by the correspondingly dimensioned connecting devices of the housing in or on the tubular tower.

Thereby the distances between the holders for the electrical conductors are determined such that no short-circuits arise due to the deformations of the electrical conductors. Here, in particular, intermediate parts or respectively spacers composed of insulation material are provided that are arranged at predetermined distances between the electrical conductors and the housing, based on the maximum occurring, or respectively permissible short circuit currents.

A particular advantage of the current conduction means system having exactly three electrical conductors consists in that a coaxial design of the electrical conductors is possible, or respectively is developed, in the housing, in that for example one electrical conductor is arranged in the geometric center of the housing and the other two electrical conductors are symmetrically arranged next to it, whereby the magnetic forces are, or will be significantly reduced.

In the scope of the invention, an (electrical) power module of a wind energy plant is understood to be an electrical unit such as a transformer and/or at least an electrical cabinet, and/or an inverter module, and/or a medium voltage system, and/or a low voltage distribution system, etc. Here, the electrical unit can comprise individual units or a combination of multiple units.

Furthermore, the housing used as the protective earthing conductor has a relatively high electrical resistance, such that in the event of a short circuit (fault), a significantly smaller short circuit current flows than in the case of a conventional power rail package having four electrical conductors. For this reason, the protective function of the protective switch is preferably activated at significantly lower currents, or respectively responds thereto.

Further, the housing, closed in cross-section, for the exclusively three electrical conductors is produced from metal, particularly sheet steel, wherein the housing has correspondingly removable covers for maintenance and inspection purposes. For this, the dimensions of the cover are or respectively will be designed small, wherein the (required) insulation spacing between the housing and the inner lying electrical conductors is or respectively will be securely maintained even under deformations caused by the magnetic forces.

One design of the tower is further characterized in that the current conduction means system is designed as a stator current conduction means system for the stator current, or the current conduction means system is designed as a rotor current conduction means system, and/or that a stator current conduction means system and a rotor current conduction means system are arranged in the tower.

The impedance of the protective earthing conductor designed using the housing for the electrical conductors, preferably is less than n-times ($n=1, 2, 3, 4, 5; n \leq 5$) the impedance of the electrical conductor arranged within the housing. It has been shown in practice that the impedance of the protective earthing conductor housing for the exactly three electrical conductors designed as protective earthing conductors running in the protective earthing conductor housing is less by a factor of 4 or 5 than the impedance of the electrical conductors arranged within the housing. This range represents a good and expedient compromise between the housing dimensions that are or can be realized, and the controllable magnetic forces (e.g. in the event of a short circuit).

Here, a preferred embodiment of the tower is characterized in that electric cables are designed outside of the current conduction means system. Three electric cables are provided, one for each phase of a three-phase alternating current, so that one electric cable in each case conducts one phase of the three-phase alternating current. As a result, the electric cables arranged or running outside of the current conduction means system designed with a housing, are connected to the three electrical conductors arranged in the interior of the housing of the current conduction means system.

In addition, it is preferred if cable feeder boxes are provided in each case preferably at an upper or lower end of the current conduction means system, or at both ends of the current conduction means system arranged in the tower so that the cable feeder boxes are connected to the electric cables in order to safely transmit power generated in the generator via the electrical conductors from the nacelle to the base of the tower.

The cable connection designed in the cable connection boxes and the feed-through of the electric cables out of the current connection boxes is designed such that it is possible to lay out the electric cables as an advantageous triple bundle.

Here, it is provided that the three electric cables are arranged outside of the current conduction means system according to the invention, and here, are preferably arranged in a type of triangular shaped cross-section, whereby as a result a reduction of the magnetic forces between the electric cables is attained or is possible.

Using this arrangement of the electric cables, imbalances or asymmetries in the current distribution are advantageously avoided, or respectively at least reduced to a minimum.

Preferably multiple systems for current conduction means are provided having respectively only three electrical conductors in the housing designed as the protective earthing conductor for the electrical conductors. Here, the only three electrical conductors arranged or running next to each other are arranged in the protective earthing housing or surrounded by the protective earthing housing.

Furthermore, the object is achieved by a wind energy plant having a tower, particularly a tubular tower. The wind energy plant is designed as described above. We expressly refer to the above explanations in order to avoid repetitions.

Furthermore, the object is achieved by a method for operating a wind energy plant with a tower, particularly a tubular tower, wherein the tower is designed as described above. In the event of an occurrence of a fault, or respectively a short circuit, the short circuit current of the current conduction means system is or will be discharged. The voltage drop between the tower wall and the housing is a maximum of 50 Volts or less (40 V or 30 V) and thus, does not exceed a predetermined touch voltage.

In order to avoid repetitions, we expressly refer to the above embodiments of the designs of the tower.

Further characteristics of the invention will become apparent from the description of the embodiments according to the invention together with the claims and the included drawings. Embodiments according to the invention can fulfill individual characteristics or a combination of several characteristics.

BRIEF DESCRIPTION OF THE DRAWINGS

The invention is described below, without restricting the general idea of the invention, using exemplary embodiments with reference to the drawings, whereby we expressly refer to the drawings with regard to the disclosure of all details according to the invention that are not explained in greater detail in the text. In the figures.

In the following figures, the same or similar types of elements or respectively corresponding parts are provided with the same reference numbers so that a corresponding re-introduction can be omitted.

DETAILED DESCRIPTION OF THE INVENTION

Figure 1:
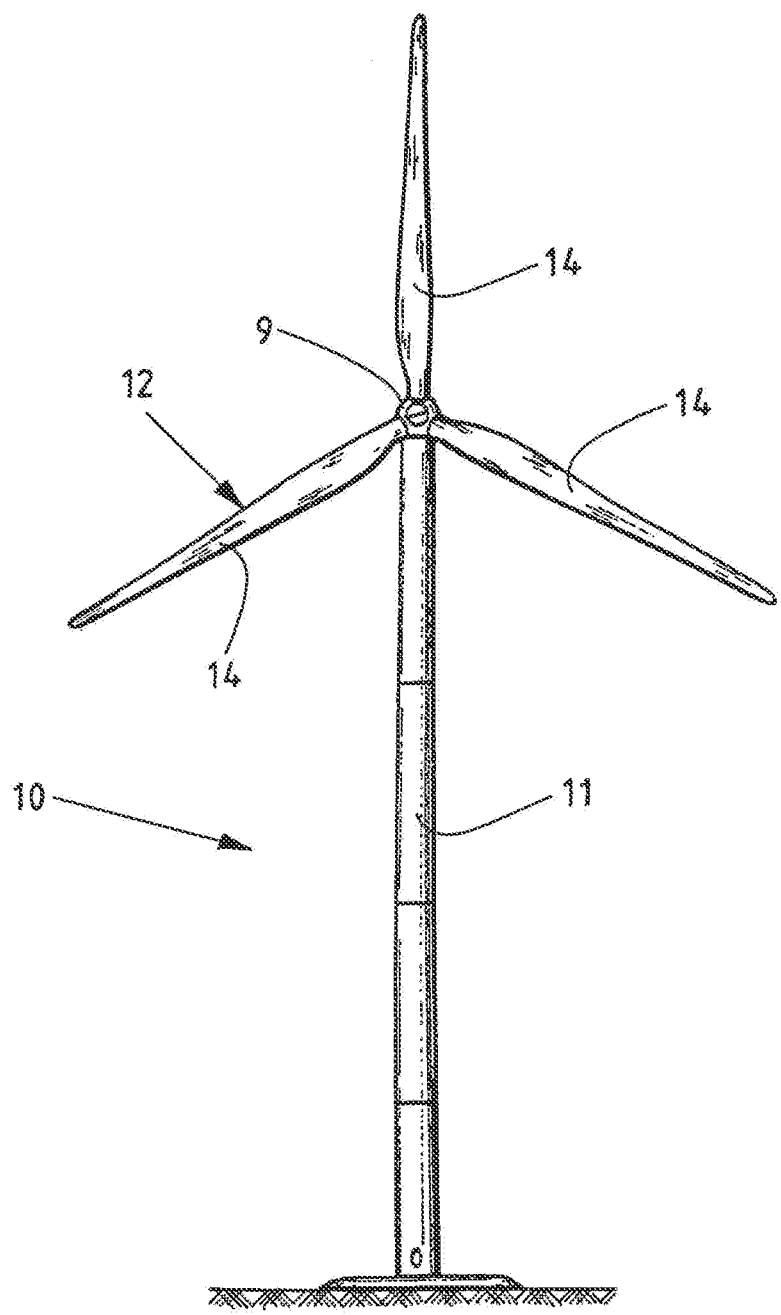
FIG. 1 is an elevation view of a wind energy plant.

FIG. 1 shows a schematic representation of a wind energy plant 10. The wind energy plant 10 has a vertically aligned tower 11 and a rotor 12, which includes three rotor blades 14 which are attached on a rotor hub 9. When the wind blows, the rotor 12 turns in the known manner. By this, power can be produced by a generator connected to the rotor 12 or respectively to the rotor hub 9 in a nacelle on the tower 11 and delivered to the consumer mains. Here, for example, a corresponding power module is arranged at the base of the tower.

The tower 11 is designed here as a tubular steel tower and consists of multiple tubular tower sections connected to one another. The tubular tower sections are also designated as a tower section, so that a tubular tower is designed as a multi-section tubular tower.

In the exemplary embodiment of a wind energy plant 10 shown in FIG. 1, the tower 11 consists of multiple tower segments which substantially share the same design. Preferably the tower segments consist of hollow cylindrical tube sections made from correspondingly suitable steel, wherein each cylindrical tower segment can taper conically from the bottom toward the top. Each of the tower segments has a continuous, closed, hollow cylindrical tower wall which extends from the flange of a tower segment to an upper flange of the tower segment. The flanges of the tower segments are substantially designed ring-shaped and extend starting from the tower wall inward into the interior space of the tower segments.

Figure 2:
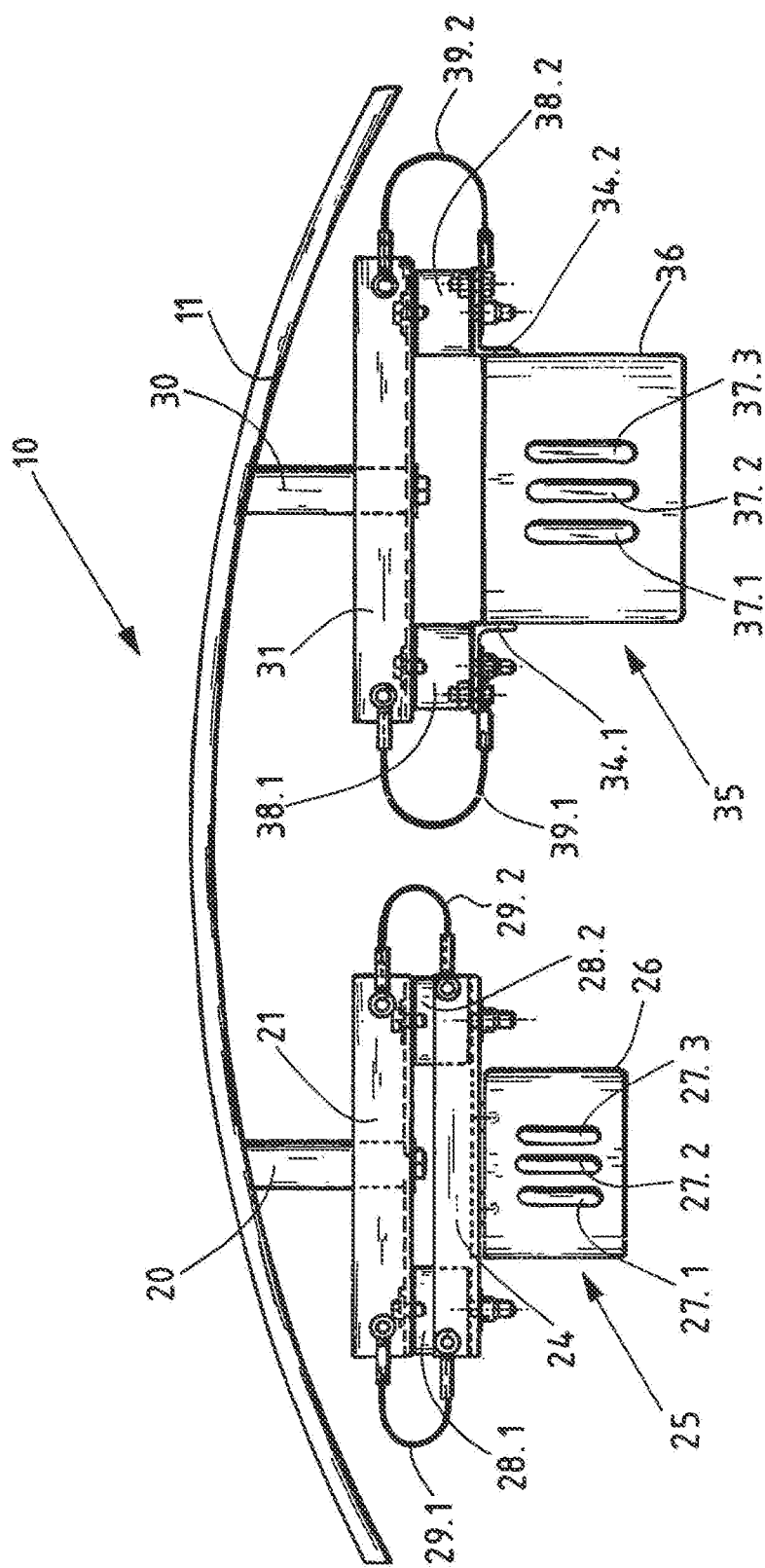
FIG. 2 is a partial sectional plan view of an arrangement of power rails in the tubular tower of the wind energy plant.

FIG. 2 shows a schematic section of an arrangement of power rails in a tubular tower of a wind energy plant. Here, bolts 20, 30 are welded at predetermined distances to the inside of a tower segment of the tower 11 in the longitudinal direction of the tower 11, or respectively of the tower segment. Using a row of bolts 20, or respectively a row of bolts 30, a power rail package 25, or respectively 35, arranged in the interior is connected to the tower wall. The power rail package 25 is designed as a rotor system for power rail conduction means, whereas the power rail package 35 is designed as a stator current conduction means system. The arrangement here is to be understood as an example and can, within the scope of the skill of a person skilled in the art, be exchanged or, for example, designed or will be designed having a tower access ladder between the power rails.

At the bolts 20, 30 arranged in each case in predetermined distances in the longitudinal direction of the tower 11, the bolts 20, 30 are connected in each case to a holder 21, or respectively 31, for example in the form of a transverse beam or the like.

The power rail package 25 implemented as a rotor current conduction means system has a housing 26 in which three power rails 27.1, 27.2, 27.3 are arranged running in the longitudinal direction. The housing 26 surrounds the power rails 27.1 to 27.3, and itself is electrically conducting.

Here, the housing 26 of the power rail packages 25 is implemented as a protective earthing conductor for the power rails 27.1, 27.2, 27.3 arranged in the interior of the housing 26. The housing 26 on the backside thereof is connected to a holder 24, wherein in each case flexible holders 28.1, 28.2 are arranged on the edge side between the holder 21 and the holder 24.

In order to connect the housing 26, which is designed as a protective earthing conductor for the power rail package 25, electrically conducting to the tower, or respectively the tower segment, the holder 21 is connected electrically conducting to the backside of the holder 24 for the housing 26, using electric cables 29.1, 29.2.

The rail package 35 designed as a stator current conduction means system has an electrically conducting housing 36 in which three power rails 37.1, 37.2, 37.3 are arranged. The housing 36 on the rear, or respectively rearward end thereof, is connected electrically conducting to the holder 31 using lateral holders 34.1, 34.2, and to the holders 34.1, 34.2 via the electric cables 39.1, 39.2 arranged thereon. On the backside of the housing 36, in each case a flexible holder 38.1, 38.2 is provided between the holders 34.1, 34.2 and the tower-side holder 31.

The use of two power rail packages 25, 35 is particularly preferred with a double-fed asynchronous generator of a wind energy plant, because the stator current is conducted via the stator current conduction means system, and the rotor current is conducted using a further current conduction means system (rotor current conduction means system). Here, in a preferred embodiment it is provided that the two power rail packages conduct the power at different voltage levels through the tower from the generator to the base of the tower.

Furthermore, in the scope of the invention it is provided that with the use of synchronous generators, the power is conducted via a single power rail package, or respectively current conduction means system, through the tower, that is from a generator to the base of the tower.

Figure 3:
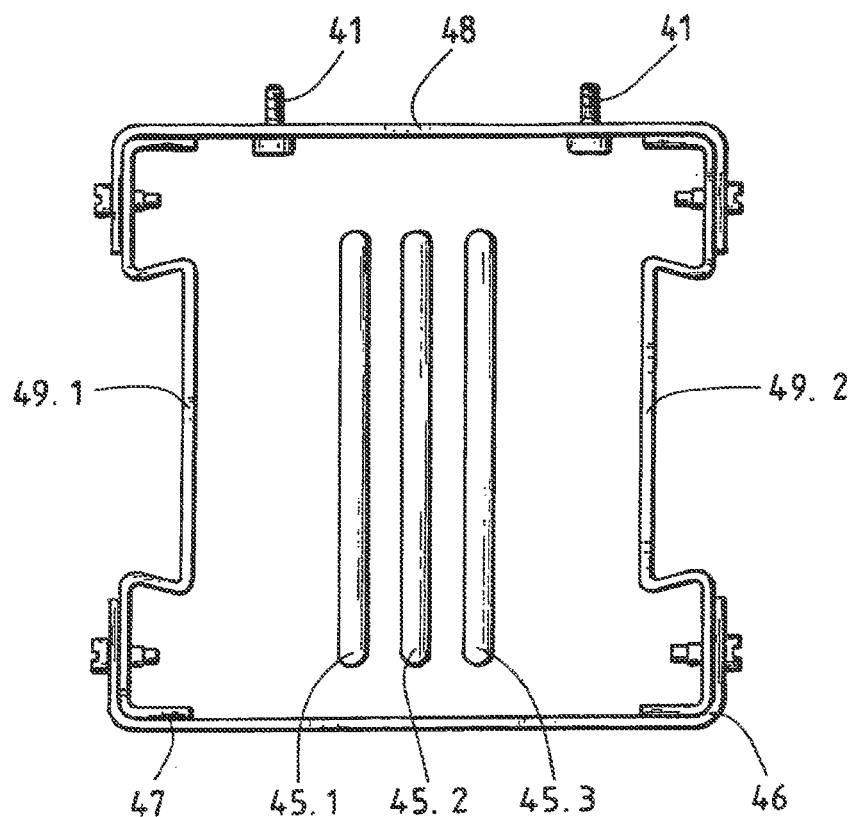
FIG. 3 is a plan view of a power rail package having three power rails.

FIG. 3 shows a further schematic design of a power rail package in cross-section, having three power rails 45.1, 45.2, 45.3, wherein the power rails 45.1, 45.2, 45.3 are arranged in a housing 46. The housing 46 is connected on the backside thereof electrically conducting to the tower wall of a tower, using fastening screws 41 and further means, or respectively devices, known to the person skilled in the art.

The housing 46 has on the front side thereof a removable housing cover 47, wherein housing side parts 49.1, 49.2 designed having recesses or moldings are arranged between the housing cover 47 and the housing back wall 48. Here, the housing cover 47 and the back wall 48 are connected together to the housing side parts 49.1, 49.2 using screws. The housing side parts 49.1, 49.2, as are the housing cover 47 and the back wall 48, are produced electrically conducting and/or preferably composed of metal, for example sheet steel.

In a further design, a type of spacer, or intermediate parts, are designed between the housing 46 and the electrical conductors arranged in the interior of the housing 46 designed as a protective earthing conductor housing, wherein these are preferably produced from an insulating material. Hereby, using the spacers or intermediate parts provided or arranged between the electrical conductors and the inside of the (protective earthing conductor) housing 46, the electrical conductors are securely arranged and guided in the housing 46, whereby a safe handling of the power rail packages is given during the assembly, and formation of a current conduction means system, which safely transmits the arising strong magnetic forces even in the event of an electrical short circuit.

Figure 4:
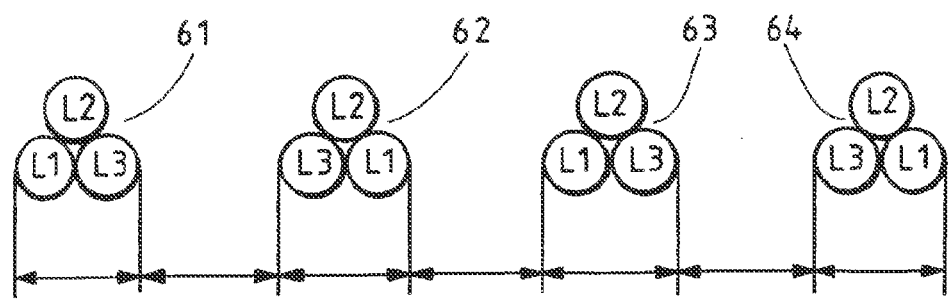
FIG. 4 is a diagram of an arrangement of electric cables.

FIG. 4 schematically shows a schematic cross-section of an arrangement of electric cables used as electrical conductors, wherein the electric cables L1, L2, L3 are compactly arranged in an arrangement having a triangular shaped cross-section. Here, the four cord-like arrangements of the electric cables L1, L2, L3 are or will be typically arranged directly in the interior of the tower on the tower wall, using fastening means for the electric cables L1, L2, L3.

As is apparent from FIG. 4, in each case three electric cables L1, L2, L3 are bundled together into a cable harness 61, 62, 63, 64, wherein each of the three cables L1, L2, L3 conducts one phase of a three-phase alternating current. Here, the cable harnesses 61, 62, 63, 64 each consisting of three electric cables L1, L2, L3, are arranged parallel to each other, outside of the cable feeder boxes, wherein particularly the thickness, or respectively the width, of a cable harness 61, 62, 63, 64 consisting of three electric cables L1, L2, L3 corresponds to the lateral distance between two cable harnesses 61, 62, 63, 64.

All named characteristics, including those to be taken from the drawings alone, and individual characteristics, which are disclosed in combination with other characteristics, are considered individually and in combination as essential to the invention. Embodiments according to the invention can be fulfilled through individual characteristics or a combination of several characteristics.

REFERENCE LIST 9 rotor hub
10 wind energy plant
11 tower
12 rotor
14 rotor blade
20 bolt
21 holder
24 holder
25 power rail package
26 Housing
27.1, 27.2, 27.3 power rails
28.1, 28.2 flexible holder
29.1, 29.2 grounding cable
30 bolt
31 holder
34.1, 34.2 holder
35 power rail package
36 Housing
37.1, 37.2, 37.3 power rail
38.1, 38.2 flexible holder
39.1, 39.2 grounding cable
41 fastening screw
45.1, 45.2, 45.3 power rail
46 Housing
47 housing cover
48 housing rear wall
49.1, 49.2 housing side part
61 cable harness
62 cable harness
63 cable harness
64 cable harness
L1 electric cable
L2 electric cable
L3 electric cable

The invention claimed is:

1. A tower (11) of a wind energy plant (10), the tower comprising:
    a current conduction means system (25, 35) for transmitting electrical power from a generator on the tower (11) to a power module at the at a base of the tower,
    wherein the current conduction means system (25, 35) has three electrical conductors (27.1, 27.2, 27.3; 37.1, 37.2, 37.3; 45.1, 45.2, 45.3) arranged next to one another in a housing (26, 36, 46),
    wherein the housing (26, 36, 46) is a protective earthing conductor for the electrical conductors (27.1, 27.2, 27.3; 37.1, 37.2, 37.3; 45.1 45.2, 45.3) arranged in the housing (26, 36, 46),
    wherein the housing (26, 36, 46) is connected to a wall of the tower at predetermined distances using connecting devices,
    wherein the connecting devices have electrical cross-sections conducting with the tower wall, and
    wherein distances between the connecting devices in the longitudinal extent of the tower (11) and cross-sections of the connecting devices between the housing (26, 36, 46) and the tower wall are dimensioned such that during a fault, a voltage drop between the tower wall and the housing (26, 36, 46) does not exceed a predetermined touch voltage.

2. The tower (11) according to claim 1,
    wherein the current conduction means system (25, 35) is at least one of a stator current conduction means system (35) for the stator current and a rotor current conduction means system (25), and
    wherein the stator current conduction means system (35) and the rotor current conduction means system (25) are arranged in the tower (11).

3. The tower (11) according to claim 1, wherein an impedance of the protective earthing conductor using the housing (26, 36, 46) for the electrical conductors (27.1, 27.2, 27.3; 37.1, 37.2, 37.3; 45.1, 45.2, 45.3) is less than n-times (n=1, 2, 3, 4, 5; n≤5) an impedance of the electrical conductors (27.1, 27.2, 27.3; 37.1, 37.2, 37.3; 45.1, 45.2, 45.3) arranged within the housing (26, 36, 46).

4. The tower (11) according to claim 1,
    wherein electric cables (L1, L2, L3) are outside of the current conduction means system (25, 35), and
    wherein one of the electric cables (L1, L2, L3) is provided for each phase of the three-phase alternating current so that each of the electric cables (L1, L2, L3) conducts one phase of the three-phase alternating current.

5. The tower (11) according to claim 4, wherein cable feeder boxes are arranged at an upper end of the current conduction means system (25, 35) that is arranged in the tower (11).

6. The tower (11) according to claim 4, wherein the electric cables (L1, L2, L3) are arranged in a triangular shape in cross-section, and are outside of the current conduction means system (25, 35).

7. The tower (11) according to claim 4, wherein cable feeder boxes are arranged at a lower end of the current conduction means system (25, 35) that is arranged in the tower (11).

8. The tower (11) according to claim 4, wherein cable feeder boxes are arranged at an upper end and a lower end of the current conduction means system (25, 35) that is arranged in the tower (11).

9. The tower (11) according to claim 1, wherein the electrical conductors (27.1, 27.2, 27.3; 37.1, 37.2, 37.3; 45.1, 45.2, 45.3) are arranged coaxially in the housing (26, 36, 46).

10. A wind energy plant (10) having a tubular tower (11), according to claim 1.

11. A method for operating a wind energy plant (10) with a tower (11) according to claim 1, wherein during an occurrence of a fault, the short-circuit current of the current conduction means system (25, 35) is discharged.

12. The tower (11) according to claim 1, wherein the wall of the tower is an inner wall.

13. The tower (11) according to claim 1, wherein the tower is a tubular tower.

\* \* \* \* \*